US011308333B1

(12) United States Patent
Langford et al.

(10) Patent No.: US 11,308,333 B1
(45) Date of Patent: Apr. 19, 2022

(54) OUTDOOR CAMERA AND NEIGHBORHOOD WATCH TECHNIQUES

(71) Applicant: Vivint, Inc., Provo, UT (US)

(72) Inventors: Landon Mark Langford, Saratoga Springs, UT (US); Michael D. Child, Draper, UT (US); Michelle Bea Zundel, Draper, UT (US)

(73) Assignee: VIVINT, INC., Provo, UT (US)

( * ) Notice: Subject to any disclaimer, the term of this patent is extended or adjusted under 35 U.S.C. 154(b) by 185 days.

(21) Appl. No.: 15/824,844

(22) Filed: Nov. 28, 2017

(51) Int. Cl.
| | |
|---|---|
| *G06K 9/00* | (2006.01) |
| *H04L 12/28* | (2006.01) |
| *G08B 13/196* | (2006.01) |
| *H04N 21/436* | (2011.01) |
| *H04N 7/18* | (2006.01) |
| *H04N 21/422* | (2011.01) |

(52) U.S. Cl.
CPC ....... *G06K 9/00771* (2013.01); *G08B 13/196* (2013.01); *H04L 12/2823* (2013.01); *H04N 7/18* (2013.01); *H04N 21/42204* (2013.01); *H04N 21/43615* (2013.01); *H04L 12/2854* (2013.01)

(58) Field of Classification Search
None
See application file for complete search history.

(56) References Cited

U.S. PATENT DOCUMENTS

| | | | |
|---|---|---|---|
| D731,906 S | 6/2015 | Troutman et al. | |
| 9,230,424 B1* | 1/2016 | Scalisi | G08B 27/005 |
| 9,388,934 B1 | 7/2016 | Kilgore et al. | |
| 9,508,239 B1* | 11/2016 | Harrison | G08B 13/2462 |
| D775,684 S | 1/2017 | Jacob et al. | |
| D776,740 S | 1/2017 | Okawa | |
| D785,067 S | 4/2017 | Ramones et al. | |
| 2009/0033746 A1* | 2/2009 | Brown | G06K 9/209 |
| | | | 348/155 |
| 2012/0257061 A1* | 10/2012 | Edwards | H04N 7/181 |
| | | | 348/153 |
| 2012/0319841 A1* | 12/2012 | Amis | G08B 25/016 |
| | | | 340/540 |
| 2013/0107041 A1* | 5/2013 | Norem | H04N 5/225 |
| | | | 348/143 |
| 2014/0078300 A1* | 3/2014 | Tine | G08B 13/196 |
| | | | 348/143 |
| 2014/0084165 A1* | 3/2014 | Fadell | G08B 17/00 |
| | | | 250/340 |
| 2015/0054949 A1* | 2/2015 | Scalisi | H04N 7/183 |
| | | | 348/143 |

(Continued)

OTHER PUBLICATIONS

Amazon Camera Skin, https://www.amazon.com/Colorful-Silicone-Outdoor-Security-Camera/dp/B01MA3RYJ9, visited Jul. 24, 2017, 2 pages.

*Primary Examiner* — Mohammed Jebari
(74) *Attorney, Agent, or Firm* — Kunzler Bean & Adamson, PC

(57) ABSTRACT

Techniques are described for security and automation system. One method includes receiving, from an exterior camera located outside a structure, data associated with an occurrence of a security event associated with the structure, activating a light of the camera based at least in part on determining the received data is associated with the security event, and initiating an action at the first location based at least in part on determining that the received data is associated with the security event.

20 Claims, 8 Drawing Sheets

(56) References Cited

U.S. PATENT DOCUMENTS

| | | | |
|---|---|---|---|
| 2016/0042621 A1* | 2/2016 | Hogg | G06K 9/00771 |
| | | | 348/155 |
| 2016/0094810 A1* | 3/2016 | Mirza | G08B 13/196 |
| | | | 348/159 |
| 2016/0203370 A1* | 7/2016 | Child | G06K 9/00771 |
| | | | 348/143 |
| 2016/0284170 A1* | 9/2016 | Kasmir | H04L 12/2818 |
| 2017/0085757 A1 | 3/2017 | Ramones et al. | |
| 2017/0085844 A1* | 3/2017 | Scalisi | H04N 7/186 |
| 2017/0220872 A1* | 8/2017 | Child | G06K 9/00771 |
| 2017/0280109 A1* | 9/2017 | Scalisi | H04N 5/2257 |
| 2017/0337805 A1* | 11/2017 | Eyring | G08B 13/1968 |
| 2018/0268674 A1* | 9/2018 | Siminoff | G08B 13/19608 |
| 2019/0108735 A1* | 4/2019 | Xu | G08B 13/19645 |

* cited by examiner

OUTDOOR CAMERA AND NEIGHBORHOOD WATCH TECHNIQUES

BACKGROUND

The present disclosure, for example, relates to security and/or automation systems, and more particularly to an outdoor camera coupled with an illumination apparatus, the illumination apparatus activating based identifying security events at a location.

Security and automation systems are widely deployed to provide various types of communication and functional features such as monitoring, communication, notification, and the like. These systems may be capable of supporting communication with a user through a communication connection or a system management action.

Present security systems, e.g., for homes and commercial businesses, have become commonplace as people seek to guard themselves and their property. These security systems typically employ sensors at entry and exit points, along with interior sensors (e.g., motion detectors, sound sensors, and glass break sensors) for determining entry or exit into or out of a property. In addition, these security systems may employ security cameras that perform various operations related to crime or other circumstances.

SUMMARY

The disclosure herein includes methods and systems for neighborhood watch and home security; for example, actions taken in response to determined home automation and security events at a single residence and/or at multiple residences in communication with one another. In some embodiments, an illuminated geographic shape coupled with a camera system may be synonymous with preventing crime and/or with neighborhood watch programs. Other determinations and actions may be related to home alarm systems, anti-solicitation, yard care, pet and animal control, home and security reminders, and the like.

A method for security and automation systems is described. The method may include receiving, from an exterior camera located outside a structure, data associated with an occurrence of an event associated with the structure, activating a light of the camera based at least in part on determining the received data is associated with the security event, and initiating an action at the first location based at least in part on determining that the received data is associated with the security event.

An apparatus for security and automation systems is described. The apparatus may include a processor, memory in electronic communication with the processor, and instructions stored in the memory. The instructions may cause the processor to receive, from an exterior camera located outside a structure, data associated with an occurrence of an event associated with the structure, activate a light of the camera based at least in part on determining the received data is associated with the security event, and initiate an action at the first location based at least in part on determining that the received data is associated with the security event.

A non-transitory computer readable medium for security and automation systems is described. The non-transitory computer readable medium may store a program that, when executed by a processor, causes the processor to receive, from an exterior camera located outside a structure, data associated with an occurrence of an event associated with the structure, activate a light of the camera based at least in part on determining the received data is associated with the security event, and initiate an action at the first location based at least in part on determining that the received data is associated with the security event.

In some examples of the method, apparatus, and/or non-transitory computer-readable medium described above, activating the light further includes activating a geometric light shape disposed around a face of the camera lens and/or illuminating the light with a selected color based at least in part on an association between the selected color and receiving data associated with the occurrence of the security event and/or illuminating the light with a selected flashing pattern based at least in part on an association between the selected flashing pattern and receiving data associated with the occurrence of the security event.

Some examples of the method, apparatus, and/or non-transitory computer-readable medium further include determining an occurrence of a second security event associated with the structure occurring after the security event, and selecting a second color to light the geometric light shape based at least in part on determining the occurrence of the second security event. Some examples of the method, apparatus, and/or non-transitory computer-readable medium for selecting a second color to light the geometric light shape based at least in part on a passage of time after the occurrence of the security event.

In some examples of the method, apparatus, and/or non-transitory computer-readable medium described above, receiving data associated with the occurrence of the security event further includes receiving data associated with the security event occurring within a predetermined distance of the structure. In other examples of the method, apparatus, and/or non-transitory computer-readable medium described above, receiving data associated with the occurrence of the security event further includes receiving data associated with the occurrence of a third security event at a second structure in wireless communication with the first structure.

Some examples of the method, apparatus, and and/or non-transitory computer-readable medium further include activating a light of the second camera based at least in part on determining the received data is associated with the third security event at the second structure, and illuminating the light with a second selected color based at least in part on an association between the selected color and determining the third security event at the second structure.

Some examples of the method, apparatus, and and/or non-transitory computer-readable medium further include sending an instruction to a third structure to active a light of a third camera located outside of a third structure based at least in part on determining that the received data is associated with a fourth security event at the third structure and the third security event at the second structure.

Some examples of the method, apparatus, and and/or non-transitory computer-readable medium further include coordinating at least one of a color and a flashing pattern of the light of the first camera, the second camera, and the third camera based at least in part on determining the security events at the first structure, the second structure, and the third structure are related.

In some examples of the method, apparatus, and/or non-transitory computer-readable medium described above, receiving data associated with the occurrence of the third security event at the second structure further includes receiving data associated with a neighboring security event at a neighboring house.

Some examples of the method, apparatus, and and/or non-transitory computer-readable medium further include determining the security event is approved based at least in part on determining historic event data occurring over a predetermined period of time.

In some examples of the method, apparatus, and/or non-transitory computer-readable medium described above, initiating the action further includes activating an alarm, closing a door, closing a garage door, locking a door, locking a window, activating sprinklers, activating a video mode on the camera, sending a notification to an occupant of the first location, sending a notification to a third party, locking a motor vehicle door, or a combination thereof.

In some examples of the method, apparatus, and/or non-transitory computer-readable medium described above, activating the alarm further includes activating one of a plurality of alarms based at least in part on determining the occurrence of a security event.

Some examples of the method, apparatus, and/or non-transitory computer-readable medium may further include sending a suggested action to an occupant of the structure based at least in part on receiving data associated with the security event.

In some examples of the method, apparatus, and/or non-transitory computer-readable medium described above, receiving data associated with an occurrence of the security event associated with the structure further includes receiving, from the camera, an indication of a presence of a person located within a predetermined distance of the location, determining that the person is not approved to be within the predetermined distance of the location, and wherein activating the light further includes illuminating the light with a predetermined color based at least in part on determining that the identified person is not approved.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The disclosure herein includes methods and systems for neighborhood watch and home security; for example, actions taken in response to determined home automation and security events at a single residence and/or at multiple residences in communication with one another. In some embodiments, an illuminated geographic shape coupled with a camera system may be synonymous with preventing crime and/or with neighborhood watch programs. Other determinations and actions may be related to home alarm systems, anti-solicitation, yard care, pet and animal control, home and security reminders, and the like.

Based on detecting events associated with one or more residences in communication with one another, the methods and systems described herein enable a determination of whether a detected event is of concern, the level of concern, and then actions taken as a result of determining the level of concern. In some cases, the geometric shape is coupled with a residence (physically and/or communicatively), and the geometric shape illuminates at least one of a plurality of possible colors, intensities, and illumination patterns based on the detected events. In other cases, other actions may be initiated based on either or both the determination of the events, the level of concern, and the illumination of the geometric shape. Actions may be initiated based on events detected at one residence, a neighboring residence, and/or multiple residences.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
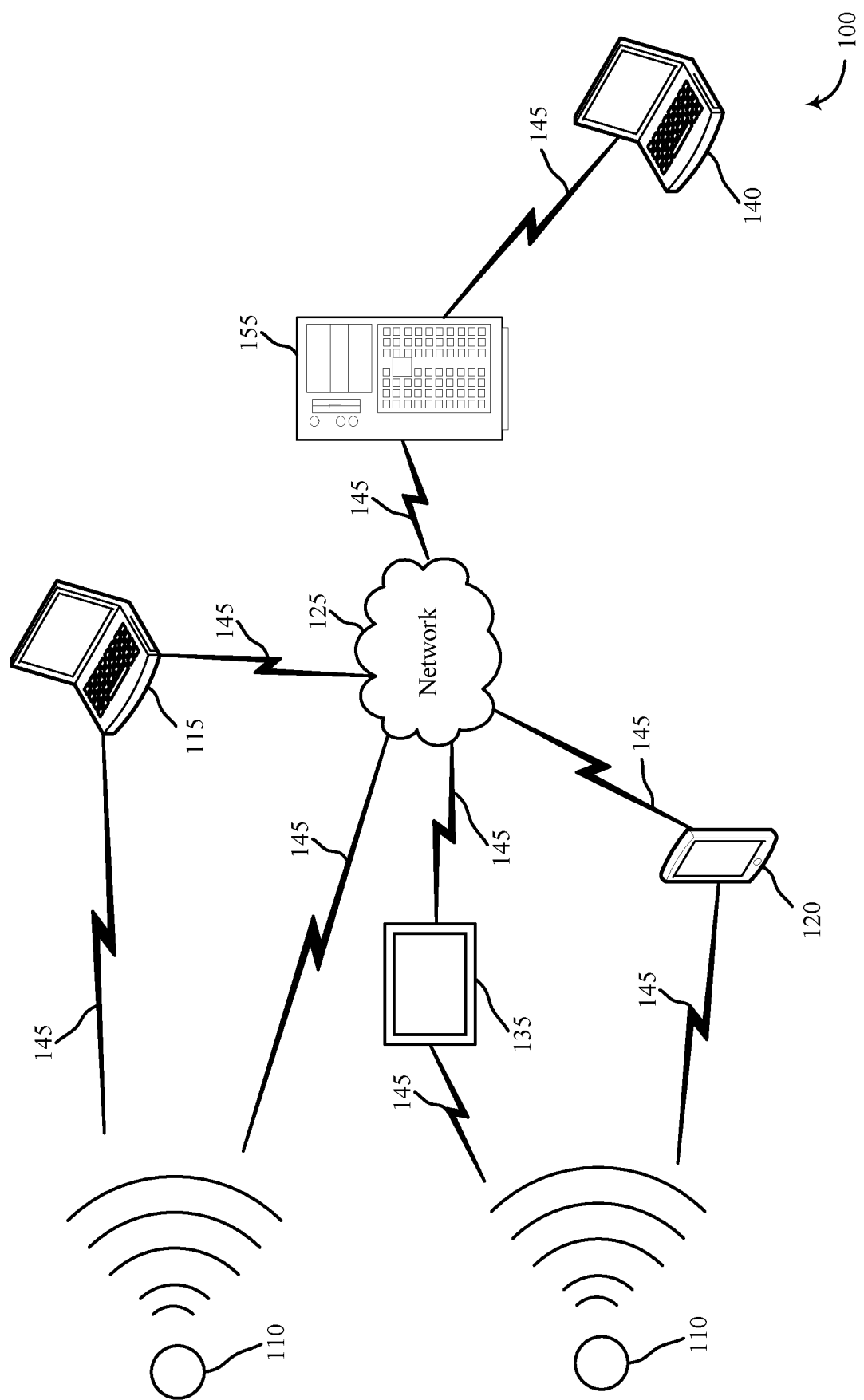
FIG. 1 shows a block diagram relating to an example security and automation system, in accordance with one or more examples of the present disclosure.

FIG. 1 shows a block diagram relating to an example security and automation system 100, in accordance with one or more examples of the present disclosure. The security and automation system 100 may include one or more sensor units 110, local computing device 120, control panel 135, remote computing device 140, and server 155. The network 125 may provide personal authentication credentials, encryption, access authorization, tracking, Internet Protocol (IP) connectivity, and other access, computation, modification, and/or functions. The control panel 135 may interface with the network 125 through a first set of wired and/or wireless communication links 145 to communicate with the server 155. The control panel 135 may perform communication configuration, adjustment, and/or scheduling for communication with the local computing device 120 and remote computing device 140, or may operate under the control of a controller. Control panel 135 may communicate with a back end server (such as the server 155)—directly and/or indirectly—using the first set of one or more wireless communication links 145. In some examples, the server 155 may be a remote server located at a location different or same from the control panel 135, the local computing device 120, and/or the remote computing device 140.

The control panel 135 may wirelessly communicate with the remote computing device 140 and the local computing device 120 by way of one or more antennas. The control panel 135 may provide communication coverage for a respective coverage area (e.g., residential, commercial). In some examples, control panel 135 may be referred to as a control device, a controller, a base transceiver station, a radio base station, an access point, a radio transceiver, or some other suitable terminology. The coverage area for a control panel 135 may be divided into sectors making up only a portion of the coverage area. The security and automation system 100 may include control panels of different types. In some examples, the security and automation system 100 may include overlapping coverage areas for one or more different parameters, including different technologies, features, subscriber preferences, hardware, software, technology, and/or methods.

For example, one or more control panels may be related to one or more discrete structures (e.g., a house, a business) and each of the one more discrete structures may be related to one or more discrete areas (e.g., multiple houses in a neighborhood). In other examples, multiple control panels may be related to the same one or more discrete structures (e.g., multiple control panels relating to a house and/or a business complex). For example, one or more control panels may be located within a house. Additionally or alternatively, each room within the house may have a designated control panel located within each room. In some cases, the one or more control panels may communicate with one another via one or more communication protocols. In some examples, the one or more control panels may form a mesh network within the house and communicate with one another via the mesh network. In some examples, a control panel may modify or update a security parameter based on information received from one or more other control panels in the mesh network.

The local computing device 120 or remote computing device 140 may be dispersed throughout the security and automation system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors), a printer, a camera, and/or the like. The local computing device 120 and/or remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, control panel 135 may be a smart home system panel, for example, an interactive panel mounted on a wall or other surface in a person's home. Control panel 135 may be in direct communication via wired or wireless communication links 145 with the one or more sensor units 110, or may receive sensor data from the one or more sensor units 110 via local computing device 120 and network 125, or may receive data via remote computing device 140, server 155, and network 125. Additionally or alternatively, the control panel 135 may wirelessly communicate with the sensor units 110 via one or more antennas. The sensor units 110 may be dispersed throughout the security and automation system 100 and each sensor unit 110 may be stationary and/or mobile. Sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system.

The local computing device 120, remote computing device 140, and/or a sensor units 110 may be able to communicate through one or more wired and/or wireless connections with various components such as a control panel, base stations, and/or network equipment (e.g., servers, wireless communication points) and/or the like. In some examples, one or more sensor units 110 may be located within a structure, e.g., house. Additionally or alternatively, in some examples, the structure may have a designated sensor unit located within one or more predetermined areas, e.g., rooms. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels.

The wireless communication links 145 shown in the security and automation system 100 may include uplink (UL) transmissions from a local computing device 120 to a control panel 135, and/or downlink (DL) transmissions, from a control panel 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, of the security and automation system 100, control panel 135, local computing device 120, and/or remote computing device 140 may include one or more antennas for employing antenna diversity schemes to improve communication quality and reliability between control panel 135, local computing device 120, and remote computing device 140. Additionally or alternatively, control panel 135, local computing device 120, and/or remote computing device 140 may employ multiple-input, multiple-output (MIMO) techniques that may take advantage of multi-path, mesh-type environments to transmit multiple spatial layers carrying the same or different coded data.

While the local computing device 120 and/or remote computing device 140 may communicate with each other through the control panel 135 using wireless communication links 145, the local computing device 120 and/or remote computing device 140 may also communicate directly with one or more other devices via one or more direct communication links (not shown). Examples of direct communication links may include Wi-Fi Direct, BLUETOOTH®, wired, and/or, and other P2P group connections. The control panel 135, local computing device 120, and/or remote computing device 140 in these examples may communicate according to the WLAN radio and baseband protocol including physical and medium access control (MAC) layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within security and automation system 100.

In an example, local computing device 120 and remote computing device 140 may be custom computing entities configured to interact with sensor units 110 via network 125, and in some examples, via server 155. In other examples, local computing device 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled with the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person.

In some examples, the sensor units 110 may be separate from the control panel 135 and may be positioned at various locations throughout the house or the property. In other examples, the sensor units 110 may be integrated or collocated with other house and/or building automation system components, home appliances, and/or other building fixtures. For example, a sensor unit 110 may be integrated with a doorbell or door intercom system, or may be integrated with a front entrance light fixture. In other examples, a sensor unit 110 may be integrated with a wall outlet and/or switch. In other examples, the sensor units 110 may be integrated and/or collocated with the control panel 135 itself. In some examples, each of the sensor units 110, control panel 135, and/or local computing device 120 may comprise a speaker unit, a microphone unit, and/or a camera unit, among other things.

In some cases, a property may be monitored by the control panel 135 and/or sensor units 110. In some examples, the control panel 135 may include sensor units 110 such that the control panel 135 may directly receive signals (e.g., motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example by monitoring heartbeat or breathing. In some examples, occupancy may be detected by any one of a motion sensor, audio sensor, RFID sensor, video camera, light-break sensor, or a combination thereof. In some examples, the sensor units 110 may be separate from the control panel 135, and may be positioned at various locations, also referred to herein as zones, throughout a property. In other examples, the sensor units 110 may be integrated or collocated with other security and automation system components. For example, a sensor unit 110 may be integrated with a wall, door, window for detecting entry and/or exit of a person relative to the property. In other examples, the sensor units 110 may be integrated or collocated with the control panel 135 itself.

In some cases, a camera 205 may be in communication with the sensor units 110, the control panel 135, local computing devices 115, 120, remote computing device 140, network 125, and/or server 155 by way of wireless communication links 145. In some cases, camera 205 may be collocated with one or more of the sensors 110. Camera 205 may additionally or alternatively comprise sensors internally. Camera 205 may determine or receive data related to security events at a single residence and/or at multiple residences.

In some cases, the control panel 135 in communication with the sensor units 110 may receive sensor data associated with at least one sensor of a home automation system. In some examples, the control panel 135 may receive a trigger to perform a security function associated with a home automation system. In some examples, the security function may be instructions to arm or disarm a property (i.e., activate alarm parameters). After receiving the instructions, the control panel 135 may determine one or more settings associated with the security and automation system 100.

Figure 2A:
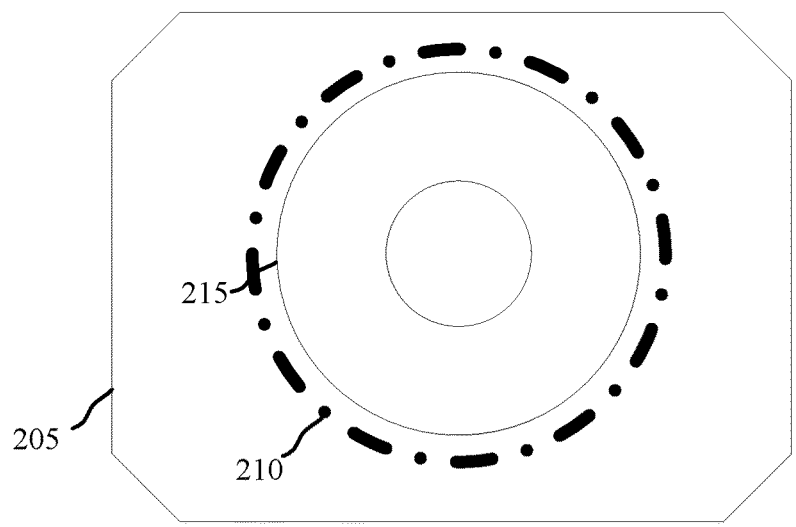
FIG. 2A shows a block diagram relating to an example security and automation system, in accordance with one or more examples of the present disclosure.
Figure 2B:
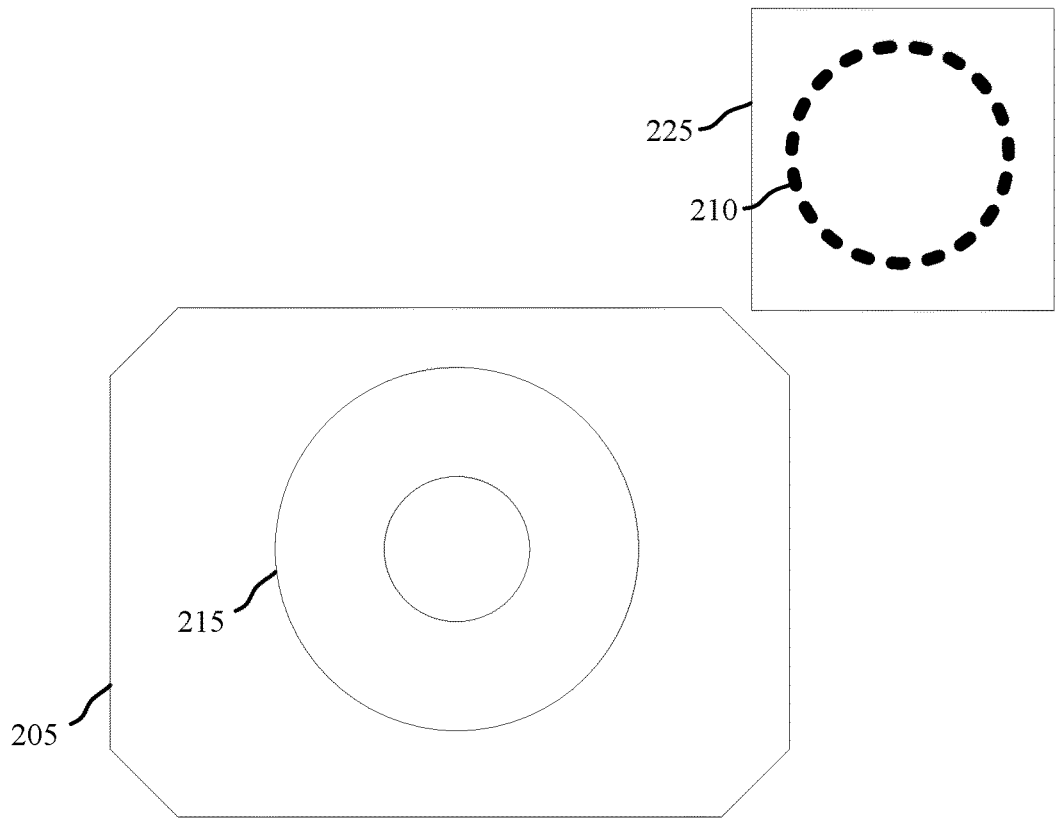
FIG. 2B shows a block diagram relating to an example security and automation system, in accordance with one or more examples of the present disclosure.

FIGS. 2A and 2B show an example of a camera relating to an example security and automation environment in accordance with one or more examples of the present disclosure. Camera 205 may be one of the sensors 110 described with reference to FIG. 1. Camera 205 may be an example of an external (e.g., outdoor) camera; however, camera 205 is not limited to outside and may be used inside. In one embodiment, camera 205 may be enabled to capture and process audio and/or pictures, both still and moving. In some embodiments, camera 205 may be co-located with an audio sensor (e.g., a microphone), a light sensor, a radio frequency (RF) sensor, a motion sensor, etc. Camera 205 may be in wired and/or wireless communication with control panel 135, local computing device 120, remote computing device 140, server 155. Additionally, camera 205 may be in wireless communication with other similarly situated cameras at neighboring structures, such as a house next door, across the street, within a neighborhood, etc. The camera 205 may also be enabled to communicate with computing devices located and/or associated with other structures, such as neighboring houses.

In one embodiment, a geometric shape 210 may be integrated with or coupled with the camera (shown as a dash-dot line in FIG. 2A). The geometric shape may be any shape, including circular, rectangular, triangular, or any other contemplated shape.

In some embodiments, the geometric shape 210 may be located on or in the camera (for example, the geometric shape 210 may be disposed around a camera lens 215) or in a housing or another component 225 independent of (e.g., separate from, next to) the camera itself, as shown in FIG. 2B. For example, in the embodiment where the geometric shape 210 is located on the camera, the geometric shape 210 may be coupled with the camera after-market by way of any attachment method. Alternatively, the geometric shape 210 may be coupled in, coupled on, integrated within, or otherwise in contact with the camera by way of any attachment method.

As another example, in the embodiment where the geometric shape 210 is located separate from the camera, the geometric shape 210 may be in communication with (e.g., wired, wireless communication) the camera. In some cases, the geometric shape 210 may be made of glass or plastic, and may be filled with a luminescent gas or other light filament (e.g., neon, argon, fluorescent light, LED, halogen); however, the geometric shape 210 is not limited to these examples and may be any structure enabled to illuminate.

The geometric shape 210 may be electronically and communicatively coupled with the camera in order to receive signals and instructions related to illumination. The signals and instructions may be received at the geometric shape 210 from the camera 205 and/or from the control panel 135. In yet other embodiments, the geometric shape may receive signals and instructions from the local computing devices 115, 120, remote computing device 140, the server 155, or from other devices by way of the network 125.

In yet other embodiments, the geometric shape may be in wired and/or wireless communication with the camera 205, but need not be co-located with the camera or adjacent to the camera; for example, the camera may be located at the front corner of a house, but the geometric shape 210 may be located near the front door.

In some examples, based on data received at the camera 205, the geometric shape 210 may illuminate. The illumination may be one of a solid color, with varying colors possible, or may be one of a periodic illumination, such as a flashing pattern. The level of illumination (e.g., amount of lumens), the colors, and the time the geometric shape 210 may be illuminated (e.g., on/off or a specific flashing pattern; a pre-determined time duration, an event-determined time-duration), may be determined based on data or events detected by the camera 205 and/or data received regarding events occurring at one or more structures. Illumination of the geometric shape 210 is discussed in more detail with regard to FIGS. 3-5.

Figure 3:
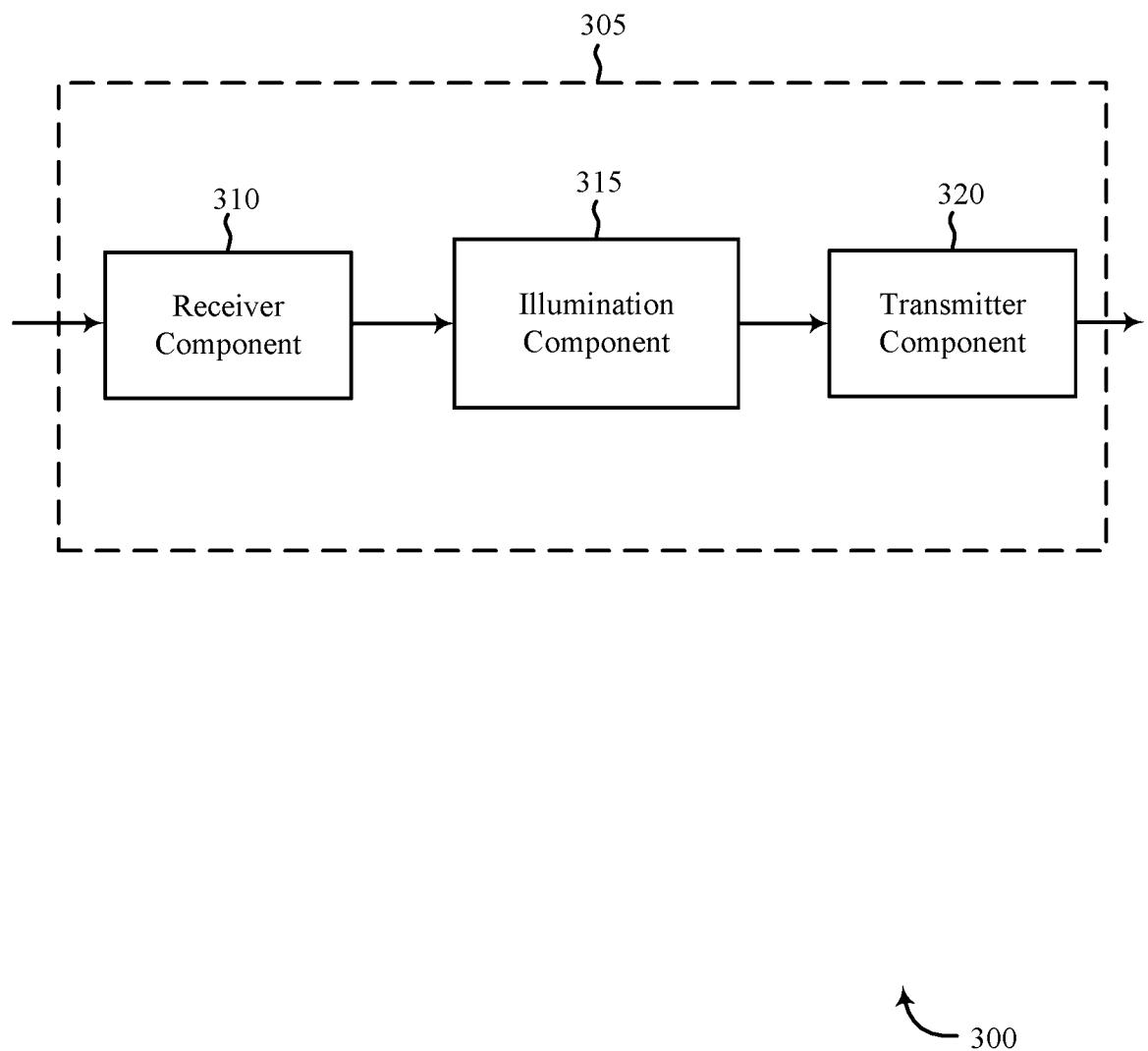
FIG. 3 shows a block diagram relating to an example security and automation system, in accordance with one or more examples of the present disclosure.

FIG. 3 shows a block diagram 300 of an example apparatus 305 relating to a security and automation system in accordance with one or more aspects of the present disclosure. The apparatus 305 may be an example of one or more aspects of a control panel 135 described with reference to FIG. 1. Apparatus may also be an example of one of the sensors 110 and/or camera 205. The apparatus 305 may include a receiver component 310, an illumination component 315, and/or a transmitter component 320. The apparatus 305 may also be or include a processor. Each of these components or modules may be in communication with each other—directly and/or indirectly, or may be co-located with one another.

In one embodiment, where apparatus 305 is a control panel, apparatus 305 may be a control panel in the form of an interactive home automation system display. In some embodiments, apparatus 305 may be a local computing device 120 such as a personal computer or portable electronic device (e.g., smart phone, smart watch, tablet computer). In some embodiments, apparatus 305 may be a remote computing device 140. In some embodiments, apparatus 305 may be coupled with at least one sensor unit 110. In example embodiments, apparatus 305 is coupled with and/or in wired and/or wireless communication with at least one outdoor camera 205 located outside of a building. For purposes of illustration, the building is a house located in a residential neighborhood; however, the building may be any type of building located in any type of zoning area (e.g., an apartment, a dorm, an office building, a warehouse).

The components of the apparatus 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner. The functions of each module may also be implemented—in whole or in part—with instructions embodied in memory formatted to be executed by one or more general and/or application-specific processors.

The receiver component 310 may receive information such as packets, user data, and/or control information associated with various information channels (e.g., control channels, data channels). In some examples, the receiver component 310 may be configured to receive instructions at the apparatus 305. In one aspect, the receiver component 310 may be configured to receive an instruction from local computing device 120 and/or remote computing device 140. In some examples, the received instruction may be in the form of a verbal command and/or a tactile input. In further examples, the receiver component 310 may receive identification information, location information and/or authentication credentials from the sensor units 110, local computing device 120, remote computing device 140, and/or server 155. In some examples, information (e.g., authentication credentials, location information) may be passed on to the illumination component 315, and to other components of the apparatus 305.

In some embodiments, receiver component 310 may receive information from camera 205. In some cases, receiver component 310 may receive information from camera 205 located at a single residence, whereas in other cases, receiver component 310 may receive information from a camera 205 at another residence in communication with receiver component 310, or from multiple residences in communication with receiver component 310. Other data received by receiver component 310 may be received from third-party sources such as emergency services, local community broadcasts, weather reports, news sources, Amber alerts, and the like.

In some cases, the illumination component 315 may receive data from the receiver, where the receiver may be communication with sensor units located at other properties, such as properties within the neighborhood or within a pre-determined geographic range. Other properties may be defined by a geo-fence, or may be defined by subdivision, city, county, state, or country boundaries. In some embodiments, properties may be in communication by default and occupants of the properties may opt-out of the systems and methods described herein. In some cases, being part of a homeowner's association may suggest or require that the homeowner opt into the system.

In addition, the illumination component 315 may use computer learning techniques and/or artificial intelligence to make determinations, suggestions, and/or take automatic actions and make adjustments. Historical data may be stored in a database, and used by the illumination component 315 to learn about situations, security events, threat levels, identified people and animals, etc. in order to initiate a light activation and/or an action. Illumination component 415 is described in more detail with respect to FIG. 4.

The transmitter component 320 may transmit the one or more signals received from other components of the apparatus 305. The transmitter component 220-*a* may transmit information collected by sensors such as actions or behaviors, times of entry or exits associated with a property, notifications and alerts, communications with third parties, and the like. In some examples, the transmitter component 320 may be collocated with the receiver component 310 in a transceiver module.

Figure 4:
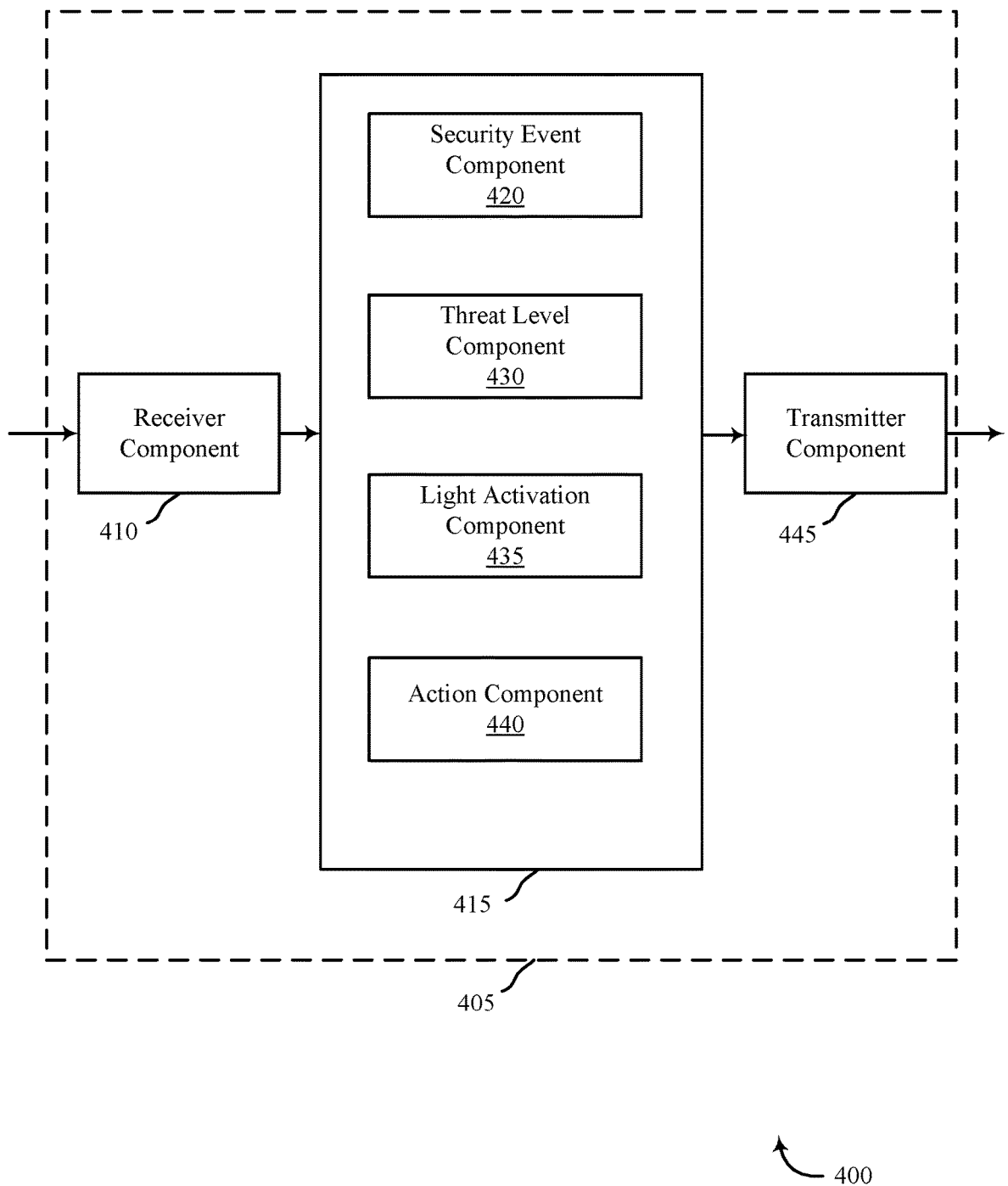
FIG. 4 shows a block diagram relating to an example security and automation system, in accordance with one or more examples of the present disclosure.

FIG. 4 shows a block diagram 400 relating to an example security and automation system, in accordance with one or more aspects of the present disclosure. The apparatus 405 may be an example of one or more aspects of a control panel 135 described with reference to FIG. 1 and/or of camera 205 and/or apparatus 305 described with reference to FIGS. 2 and 3, respectively. In some embodiments, outdoor camera 205 described with reference to FIG. 3 may be co-located with apparatus 305 or 405. The apparatus 405 may include a receiver component 410, an illumination component 415, and/or a transmitter component 445. The apparatus 405 may also be or include a processor. Each of these components or modules may be in communication with each other—directly and/or indirectly. In one embodiment, where apparatus 405 is a control panel, apparatus 305 may be a control panel in the form of an interactive home automation system display. In some embodiments, apparatus 405 may be a local computing device 120 such as a personal computer or portable electronic device (e.g., smart phone, smart watch, tablet computer). In some embodiments, apparatus 405 may be a remote computing device 140. In some embodiments, apparatus 405 may be coupled with at least one sensor unit 110. In example embodiments, apparatus 405 is coupled with and/or in wired and/or wireless communication with at least one outdoor camera located outside of a building.

In some examples, the illumination component 415, may include security event component 420, threat level component 430, light activation component 435, and/or action component 440. In some aspects, the illumination component 415 may be an example of one or more aspects of illumination component 315 described with reference to FIG. 3. The components of the apparatus 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner. The functions of each module may also be implemented—in whole or in part—with instructions embodied in memory formatted to be executed by one or more general and/or application-specific processors.

The receiver component 410 may receive information such as packets, user data, and/or control information associated with various information channels (e.g., control channels, data channels). In some examples, the receiver component 410 may be configured to receive instructions at the apparatus 405. In one aspect, the receiver component 410 may be configured to receive instruction from local computing device 120 and/or remote computing device 140. In some examples, the received instruction may be in the form of a verbal command or tactile input. In further examples, the receiver component 410 may receive identification information, location information and/or authentication credentials from the sensor units 110, local computing device 120, remote computing device 140, and/or server 155. In some examples, information (e.g., authentication credentials, location information) may be passed on to the illumination component 415, and to other components of the apparatus 405. In some aspects, the receiver component 410 may be an example of one or more aspects of the receiver component 310 described with reference to FIG. 3.

In some examples, the security event component 420 may communicate with the receiver component 410, where the receiver component 410 may receive data or information from at least one of the sensors 110 and/or camera 205 of an event or situation which may be indicative of a security breach, safety situation, anomaly, disruption, or other situations that may be addressed. For brevity, these situations may be considered "security events" herein; however, the monitored events and situations are not limited to these examples and may include any event or situation in which a user may have interest. In some examples, the sensors 110 and/or camera 205 may continuously sense for security events without being constrained to a time frame. In other examples, the sensors 110 and/or camera 205 may operate on a periodic state (e.g., every minute, every 10 minutes, every hour) or may activate based on a change of light, pressure, sound, movement, scent, and the like. In order to aid in accurate security event determination, events, motion, sounds, etc., detected by the sensors 110 and/or camera 205 may be tagged or otherwise confirmed by users of the home automation systems to which the sensors 110 are in communication. For example, the sound of a certain pet barking may be tagged, or the biometrics of authorized and unauthorized users may be tagged. The tagging may aid in computer learning for future automated decision making by the system. In other examples, the security event component 420 may receive data or information from one of the users manually inputting or transmitting data to the security event component 420.

In some examples, security events may be detected by the security event component 420 and/or the camera 205 and/or the sensors 110 when the system is in an "armed" state. The users may opt-in to an armed state, whereas in other cases, the security state defaults to an "armed" state and users may opt-out if desired. In some examples, security events may be associated with determining the presence of an unauthorized person (e.g., delivery person, unauthorized guest, stranger), a potential break-in, unauthorized removal of a delivered package or mail, a door opening, a window opening, glass breaking, data indicative of a fire or excessive carbon monoxide presence, sirens, sounds of crying or screaming, other sounds of struggles or emergencies, flooding, power outages, pet alerts, and the like. In other examples, security events may be detected regardless if the system is in an "armed" state.

Security events may be detected by the security event component 420 and/or the camera 205 and/or the sensors 110 through the use of computer learning and/or artificial intelligence methods. Historical data may be gathered and analyzed in order to determine a pattern of behavior, expected versus actual behavior, changes over time, and the like. In some embodiments, security events may be learned with respect to a single structure (e.g., one person's house and events associated with the house) or may be aggregated and analyzed with respect to multiple structures (e.g., two or more houses in a neighborhood or otherwise associated with one another).

For example, security event component 420 may determine that a car driving by a single house or multiple houses once is not an event to be concerned about. More specifically, events may be "of concern" or "of note" based on current user input, current occupancy detection, pre-determined user preferences, historical data, computer-learning techniques, and the like. Likewise, the camera 205 may detect a car driving by (or stopped in front of a house), and security event component 420 may determine that a car driving by a single house or multiple houses multiple times over the course of a day or week is not a security event because the car is determined to belong to one of the occupants of the houses' or is otherwise determined to be a car associated with an authorized user. However, if one or more cameras detect the same car has driven by multiple times, and the car is not recognized as being associated with one of the houses, security event component 420 may determine a suspicious activity, and may initiate a security action.

One or more of the houses' may communicate with a database storing information related to each house and its' occupants, guests, and authorized and unauthorized users. In addition, the security event component 420 may communicate with third-party sources to receive information used to make determinations if an event is a security event; for example, the security event component 420 may communicate with emergency services, news sources, receive Amber alerts, and the like.

In another example, security event component 420 may detect a number of people and/or animals outside a house or outside multiple houses. Based on historical data and other received data (automatically determined and/or based on user input), the security event component 420 may determine that someone is having a party or there is a neighborhood gathering. However, if no party is expected, or the people are determined to be unauthorized or unknown, security event component 420 may initiate a security action.

In another example, if certain events are detected as reoccurring over a pre-determined period of time, the security event component 420 may determine these events to be recognized and authorized. As a result, the security event component 420 may suggest to the occupant of a house an update to the rules, or may adjust the rules automatically. In one case, the field of view on the camera may change to receive more data or to receive better data. For example, if the camera learns that 95% of the movement in its field of view occurs in the bottom right hand corner of the frame (e.g., 2% of the frame), then the camera 205 may send out a notification to the occupant to adjust the field of view of the camera. In another embodiment, the camera may adjust itself automatically. In some cases, neighboring cameras may have overlapping fields of view. In this example, cameras having overlapping fields of view may have user-defined permissions to share data obtained by the camera. For example, if two houses have cameras having a view of a street sign on the camera, but from different vantage points, the occupants of each house may have permission to view the data which includes the shared views (e.g., the street sign). In some cases, one neighboring having permission to view another neighbor's camera data may be based on user-defined preferences and permissions; however, in another case, neighbors may be granted automatic permission based on a determined threat level.

For example, if the threat level is determined to be high at one house or a neighboring house determines another house has a geometric shape lit up red, then the camera data may be automatically shared and/or transmitted to any of a potential group of recipients (e.g., neighbors that have opted-in, emergency services, occupants, family members, etc.)

In another example, security event component 420 may determine that the garbage truck comes every Friday between 8:00 a.m. and noon; however, if the garbage truck shows up on Tuesday at 4:00 p.m., an alert may be sent out that there is an anomaly. In addition, the geometric shape may light up a pre-determined color that indicates a reminder; for example, if the user normally puts his or her trash cans out on Thursday before work, and the system determines the trashcans are not out by 5:00 p.m. on Thursday, the geometric shape may be illuminated blue such that when the occupant arrives home from work at 5:30 p.m., he or she sees a first light color, pattern, or other indicator (e.g., a blue light) and knows there is something he or she must attend to.

In contrast, if the security event component 420 has determined over the last year that the garbage trucks comes every Friday between 8:00 a.m. and noon, but over the last month, the garbage truck has been arriving on Tuesday between 2:00 p.m. and 5:00 p.m., the security event component 420 may determine there has been a change in schedule. As a result, the security event component 420 may send the occupant a notification regarding the change and to suggest a change to the rules and/or the security threat component may adjust the rules itself based on the learned changes.

Threat level component 430 may determine an appropriate threat level based at least in part on the detected security event or events, user preferences, learned events, and other situations. For each security system, there may be a default set of threat levels; however, occupants may input personal preferences into the system to customize the number of threat levels and which security events (including when, where, who, etc.) are indicative of which of the threat levels. In other cases, as the system determines security events, and occupant responses and behaviors to the determined security events, the system may learn which events are considered security events, which security events fall into which threat level, and what a subsequent response to the threat level may be. For example, one occupant may originally input into the system that she wishes to categorize the activation of a motion sensor as a medium threat level event; however, every time the motion sensor activates, and the threat level is set to medium, the occupant inputs an "ignore" command into the control panel 135. Over time, therefore, the system may learn that the occupant does not consider activation of a motion sensor to be a medium threat level, but rather a low threat level.

Further, a person may be initially identified as unknown or authorized, and thus the person's presence on the property may result in a higher threat level. Over time, or based on user input, the person may become an authorized guest, and thus the person's presence at the house may result in no threat level. Based on the determined threat level, illumination component 415 may initiate an action, such as illuminating the geometric shape 210 and/or initiating a security action.

Light Activation Component 435 may activate the geometric shape 210 based at least in part on determining that a security event has occurred at a location and based on a determined security threat. In an example embodiment, the geometric shape 210 may be associated with deterring crime or with a neighborhood watch program. More specifically, it may be known in the community that a house with a geometric shape illuminated red is on a higher alert than a house having a geometric shape illuminated yellow or not illuminated at all. Each color and/or pattern may be known in the community to be associated with different security events, different situations, different associations, and the like.

For example, a house that is associated with an active neighborhood watch program may have a geometric shape that is illuminated a certain color (e.g., constantly, during certain intervals). Intruders may recognize the light color (e.g., white, orange) as being associated with the neighborhood watch and may decide to select a different house or abandon an intrusion plan all together. In another example, a geometric shape illuminated red might indicate that camera 205 and/or sensors 110 at the house have detected the signs of an intrusion, and have activated an alarm system, increased the frequency and/or resolution of a surveillance camera (e.g. camera 205), has placed a call to an emergency service, has notified an occupant and/or a third party about an anomaly, etc.

In addition, a geometric shape at one house may illuminate a specific color based on what is happening at a neighboring house. For example, if a neighboring house experiences a security event, such as a break-in, a device, (e.g., the camera, the control panel, a mobile user device) at one location (e.g., the neighboring house) may send out communications to other connected systems to illuminate each system's camera a specific color.

In some embodiments, different security events may be assigned different colors, patterns, indicators, or some combination. The color/event association may be based on user preferences, may be pre-programmed, may be pre-determined based on a neighborhood association (e.g., homeowner's association, neighborhood watch, police-established default colors), and the like. If the light colors and patterns are user defined, the user may input the preferences related to the lights at the control panel 135 and/or on a software application executing on local computing device 120.

For example, if the threat level component 430 determines a threat level at the house to exceed a "high" threshold, the color of the geometric shape may be red. If the threat level is less than the "high" threshold, but higher than a "low" threshold, the color of the geometric shape may be orange. If the threat level changes from "high" to "medium," the illuminated geometric shape may change from a first color to a second color (e.g., red to orange). If the threat is cleared, or actions are taken, the geometric shape may change to a third color (e.g., green), before returning to a default color (e.g., white) or may turn off completely. The geometric shape may illuminate other colors based on other events.

In other embodiments, the geometric shape may not only be illuminated, but it may also "flash" different patterns. For example, the light may have a rapid, blinking pattern which may be used to catch the attention of passers-by in the event of a security event. In other examples, the light may blink slower to indicate other security events or situations. Other combinations of light colors, light intensity, and flashing patterns may be contemplated; for example, the geometric shape may light up red, but the level of intensity (e.g., amount of lumens) may vary based on the determined threat level. In another example, the geometric shape may light up red, have a high level of intensity, and be flashing rapidly to indicate a significant security threat. In yet other examples, the colors may vary (e.g., red fading to blue, red flashing intermittently with blue, etc.), the intensity may vary (e.g., illuminating brightly, subsequently dimming, and cycling through an intensity gradient), and or the flashing patterns may vary over time. The combinations of colors, intensity, and patterns are not limited by these examples, and other combinations may be contemplated.

Action component 440 may initiate an action at the house based at least in part on determining that data captured by the camera (or a neighbor's camera and/or one or more other devices, such as sensors) is associated with a security event. In some embodiments, based on the determined security event and/or threat level, action component 440 may initiate activation of a home alarm inside and/or outside of the home.

In some embodiments, the occupant of the house and/or a third party may determine different zones associated with the house, the curtilage, the public street, neighbors' properties, etc. For example, the occupant may determine different zones located relative to the house—one zone may be a circle having a radius of 15 feet from the house, another zone may be a circle having a radius of 30 feet from the house, etc. Other zones may include certain areas relative to a house, such as the lawn, the flower beds, the driveway, the front porch, the back yard, and the like. Other customizable options may include times of day when certain actions are taken, when certain areas are monitored in different ways, when certain situations are monitored, times of the year, holidays, etc. Further, the occupant and/or neighbors associated with the occupant, may establish a database of people and animals that are known, authorized, and unauthorized. Based on the identification of a person or animal, the location of the person and/or animal in a specific zone and/or during a specific time, different actions may be taken with respect to the camera 205, the geometric shape 210, and the illumination component 315.

For example, if an unauthorized or unknown person is determined to be in the yard at 10:00 p.m. on a Wednesday, and the occupant has set up rules that indicate actions to be taken when an unknown person is determined to be in the yard on a weekday past 9:00 p.m., then the system may respond accordingly. More specifically, the geometric shape 210 may illuminate a specific color or flashing pattern, and an alarm may be sounded. In some example cases, the alarm may be an audible siren sound and/or the alarm may be a silent alarm that triggers a response from an occupant and/or a third party. In some example cases, the alarm may be a pre-recorded audio segment that is broadcast (e.g., "You are being recorded," "Please leave the premises," etc.).

In addition, or in the alternative, the garage door may shut, and the house and car doors may lock separate from or together with illumination of the geometric shape 210. In some cases, determining that an unauthorized person is in the occupant's yard on a Wednesday at 10:00 p.m., may additionally or alternative trigger an action at a neighbor's house; for example, the neighbor's garage door may close, the neighbor's geometric shape may illuminate, and the house and car doors at the neighbor's house may lock.

In one embodiment, if the camera 205 detects an unknown person has been standing in a location associated with the house longer than a pre-determined period, an alarm may sound in the house and/or a notification may be sent to a user (e.g., an occupant), a neighbor, or a plurality of neighbors that have opted-in to the system. For example, if someone is detected standing in the yard for over 2 minutes, as opposed to someone walking through the yard or walking by on a path, the home occupants may be notified of the person's presence and/or an alarm may be activated. For different areas of the home and curtilage, different time thresholds may be established. For example, detecting an unknown person may be of more significance within a 10 foot radius of the house after 8 p.m. on weekdays, as it seems unlikely to have an unexpected guest during that time frame; however, detecting an unknown person within a 10 foot radius of the house between 9 a.m. and 5 p.m. on weekdays may indicate a mailman, a delivery person, utility workers, and the like, and is thus less likely to be of concern.

In one case, an unknown person standing at the end of the driveway may not trigger a notification and/or an alarm until 2 or 3 minutes have passed; whereas, an unknown person standing within 10 feet of the backdoor for 1 minute may be enough to trigger a notification and/or an alarm.

In addition, an outdoor alarm separate from or in conjunction with illumination of geometric shape 210 may sound to startle or scare off an intruder or a solicitor. In addition, an outdoor alarm may be used to scare of unwanted animals in the yard if an unapproved animal is detected as loitering on the property. For example, if an unwanted dog is detected in the yard, or a deer is detected within a certain distance or area (e.g., eating flowers from a garden), the system may emit a high frequency noise, an illumination color and/or pattern, or animal-specific noise to deter the animal. In some embodiments, an alarm noise used to deter an intruder may be different than an alarm noise used to scare off loiters, solicitors, or animals.

In addition to or in the alternative to activation of the geometric shape 210, other systems associated with the house may be activated when an unknown or unwanted person or animal is detected at the house or in the curtilage; for example, the sprinklers may be activated or a spotlight may be activated. The security action may be determined based on determining a specific type of animal; for example, the action may be different if the animal is determined to be a neighbor's pet versus determining that the animal is a wild animal such as a bear, mountain lion, snake, alligator, or other dangerous wild animal.

In some cases, the detected person or animal may not be unknown, but may be recognized and unwanted. For example, a person may be identified based on biometrics such as facial recognition, gait, voice prints, or a person may be identified based on clothing, logos attached to clothing, license plate numbers, car types, etc. A database associated with the camera 205 may contain user-provided identifications and associated information from which the illumination component 415 may use to compare and analyze to determine authorized, unauthorized, known, and/or unknown people. In addition, the illumination component 415 may obtain information from other cameras and associated systems in the neighborhood, an application programming interface (API) associated with third party sources, such as neighborhood watch information, police bulletins, news reports, and the like.

Other security actions may be enabled by the action component 440; for example, an alarm system may be armed or deactivated, a garage door may be closed, doors may be locked, car doors may be locked, home occupants and/or neighbors may be notified, cameras associated with neighboring houses may receive an instruction to illuminate the camera's geometric shape, emergency services may be contacted. For each possible action, the action may be enabled as a default when a security event occurs (e.g., someone is on the property for more than 2 minutes); however, in other cases, the action may be enabled based on identifying the person and/or animal.

Other actions may be taken to protect occupants or neighbors from situations. For example, if the house has a pool in the yard and a child is detected as being near the pool, and the child is determined to be in a dangerous situation (e.g., no one is expected to be at the pool, the system identifies the child as being unknown or as being known not to be able to swim, the system hears crying or screaming for help), then the action component 440 may activate an alarm to scare the child away from the pool or to alert someone nearby that there is a potential issue. In addition, the action component may send a notification to an occupant or a third party that indicates there is a potentially harmful situation at the pool. Other similar situations may include children on or near playground equipment, a trampoline, machinery (e.g., snow blowers, lawn mowers), etc.

In still other embodiments, the camera 205 may recognize that the lawn is turning brown or that other plants are dying, and the action component 440 may automatically activate the sprinklers. In other embodiments, determining that the yard needs watering may trigger sending a notification to the occupant or to a homeowner's association. Other yard detection possibilities may include recognizing that weeds have sprouted and need attending to, and thus the action component 440 may notify the occupant of the situation.

In one embodiment, a user may create custom zones in the yard (e.g., sidewalk, driveway, lawn, around shrubbery, around flower beds). Over time, the illumination component 415 may determine what is "normal" and/or "expected." When an anomaly is detected, the action component 440 may send a notification to the occupant, or may otherwise take an action to attend to the anomaly, such as activating an irrigation system. For example, the system may determine over time that the home occupant hand waters the flowers every third day; however, the system has determined that no one has been in the yard to water the flowers over the last 6 days. As a result, the action component 440 may send the occupant or a third party a notification and/or may activate an irrigation system to water the flowers automatically. In another embodiment, the system may determine what is "normal" for the lawn, but may detect that a dandelion or a mushroom has grown in the yard unexpectedly. As a result, the action component 440 may send the occupant or a third party a notification.

The transmitter component 445 may transmit the one or more signals received from other components of the apparatus 405. The transmitter component 445 may transmit information collected by sensors such as actions or behaviors, times of entry or exits associated with a property, notifications and alerts, communications with third parties, and the like. In some examples, the transmitter component 445 may be collocated with the receiver component 410 in a transceiver module. In some aspects, transmitter component 445 may be an example of one or more aspects of transmitter component 320 with reference to FIG. 3.

Figure 5:
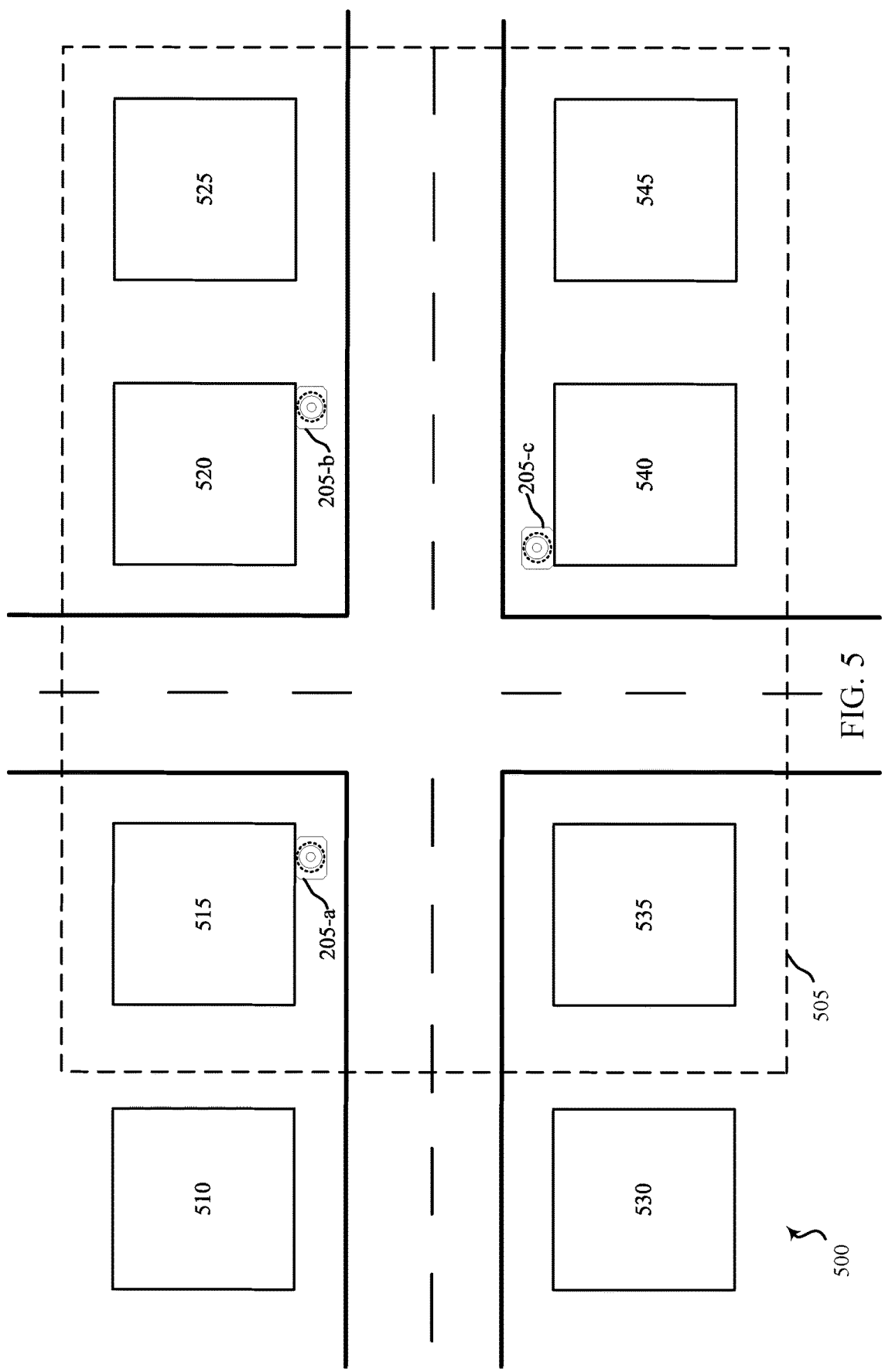
FIG. 5 shows a block diagram relating to an example security and automation system, in accordance with one or more examples of the present disclosure.

FIG. 5 shows a diagram relating to an example security and automation system in accordance with one or more aspects of the present disclosure. In particular, FIG. 5 shows an example residential neighborhood 500 having eight example houses 510, 515, 520, 525, 520, 535, 540, and 545. Although FIG. 5 shows an example residential neighborhood with houses located within a geographic area of one another, it should be understood that neighborhood 500 may be a residential area, a commercial area, a rural area, an industrial area, and/or a mixed use area. In addition, the houses 510-545 may be any type of structures, and the structures need not be located next to one another, but rather may be located in different geographic locations separated by any contemplated distance (e.g., same sub-division, same commercial block, same multi-unit building, different sub-divisions, different commercial blocks, located on the same street but separated by one or miles). The systems and methods described herein relate to the example residential neighborhood 500, but the system and methods are not limited to neighborhood 500.

In neighborhood 500, any of the eight houses 510-545 may be coupled with at least one sensor (e.g., an audio/visual device, such as a security and/or outdoor camera, vibration sensor, biometric sensor, infrared sensor, motion sensor) in wireless communication with at least one sensor and/or computing device and/or control panel associated at another house in neighborhood 500; however, not all of the devices may be in wireless communication with each other. Dotted line 505 shows a grouping of houses which are wireless networked to communicate with at least one other house located within the dotted line 505 by way of at least one audio/video device located at and/or associated with houses within the dotted line. Thus, in one example, the devices and/or houses may be part of a network based on proximity within a location; however, in other examples, the devices may be part of a network based on a specific association. For example, a community network may include a neighborhood-based social network, a social group network, an opt-in network that is not proximity based (e.g., homes in a subdivision, but not necessarily homes on the same street or block), an opt-in network that is proximity based, an automatically established network link based on location and proximity (e.g., portable electronic device running an application enters a building enabled to perform the methods described herein), or a neighborhood watch group. For example, houses 515, 520, 525, 535, 540, and 345 may all be part of a neighborhood watch group having cameras 205-*a* through 205-*f* with geometric shapes described above, whereas houses 510 and 530 are not part of the same neighborhood watch, even though houses 510 and 530 are located in the same neighborhood.

In this example, the six houses that are in networked wireless communication with each other are shown to be next to one another, however, the networked houses need not be next to each other. For example, houses 515, 520, 540, and 545 may be wirelessly networked in another example. In another example, any or some of the houses shown in within dotted line 505 may also be in wireless communication with a house (e.g., based on a device associated with and/or located at a house communicating with a device associated with a second house) that is not shown in FIG. 5.

Each of the devices associated with the location of each of the houses may share any or all of the same capabilities as each other device. For example, a device associated with house 515 may be enabled to obtain data from a first sensor at house 515. The sensor may be coupled with or collocated with camera 205-*a*. The sensor may be physically integrated as part of the device and/or may be in wired and/or wireless communication with the device. The data obtained by the sensor may include: biometric and personal data such as fingerprints, retinal scans, facial scans, gait, height, weight, speed, cadence, hair color, hair length, presence of facial hair, tattoos, piercings, jewelry, clothing style, clothing color, voice recordings, personal identification numbers, radio frequency data related to a radio frequency identification (RFID) tag associated with a person, identification of an electronic device such as a smartphone, table, or wearable electronic device, and the like.

The sensor may also obtain data related to animals, vehicles, environment, and non-tangible items, such car types, delivery vehicles, company logos, identification card data, rain, wind, sounds related to walking, running, talking, screaming, laughing, wind, glass breaking, doors opening and closing, sirens, alarms, etc. which are determined to be within a predetermined proximity of example house 515.

In addition, the device may receive identification data related to a person or an event at or within a predetermined distance of example house 515. For example, with respect to a person, the device may associate or compare the data obtained from the sensor with a plurality of user profiles associated with house 515 or past data. In other examples, the user profiles may be associated with other houses in the neighborhood which are in networked communication with one another. The user profiles may be profiles of an allowed and/or expected users and/or guests at example house 515, or other networked houses. User profiles may also include user preferences related to security event detection and threat level assignment, as well as preferences related to when and what actions should be taken in response to determining a security event and threat level.

The user profiles may be stored individually for each house and/or combined into a database for some and/or all of the networked devices. Some profiles, sensor data, determinations, comparisons, or other information may be shared with some devices with user permission or based on user preferences. For example, in the case of an emergency or a detected security event, more profile data may be shared with more of the networked devices within the area indicated by dotted line 505. If the user interacts with the system using a software application (such as on a smartphone or a control panel), the software application may query the user on what, if any, information the user would like to share with the rest of the networked users.

In other examples, other identification data related to a person may be received from remote and/or third-party databases and/or reports and/or broadcasts and/or publications. For example, identification data from a criminal database, missing child and/or persons database, newspaper articles, news broadcasts, radio broadcasts, television broadcasts, digital streaming broadcasts, and the like.

With respect to a security event, the device may associate the data obtained from the sensor with predetermined, pre-stored, and/or computer learning algorithmic determined elements related to one or more security events. For example, the device may obtain information related to opening and closing a door, window, gate, garage door, blinds; a vehicle ignition starting, turning off, speeding, idling, swerving, crashing; weather data such as rain, wind, snow, hail; glass breaking; talking, screaming, laughing, etc., located within a predetermined distance of example house 515. Based on the data received, user input, changes in preferences, and/or communication from and between other devices, each device may learn the association between obtained data and/or identification data which may not have been previously predetermined or preprogrammed into the system.

The device may compare the data obtained with identification data received to determine if a security event has occurred and/or if an identified or non-identified (or authorized or unauthorized) person is associated with the event. In some examples, the person and/or the event may be allowed and/or expected, while in other examples, the person and/or the event may be unauthorized, and thus may be determined to be a security event. In other examples, the person and/or event may not be able to be determined and/or identified; however, through computer learning algorithms and other input, over time, the device may be able to identify people and/or events over time, and thus determine that the identification of a person or event does not qualify as a security event.

Based on data received from sensors associated with another house in the neighborhood (e.g., house 520), or other information obtained from sources described above, the system may determine a threat level for house 515, and consequently may activate the geometric shape 210 associated with house 515. For example, camera 205-*b* associated with house 520 may receive data indicative of an unwanted visitor. As a result of determining a security event, camera 205-*b* may enable a transmission to house 515 camera 205-*a* (and/or associated systems) that there is an unwanted visitor at house 520. Based on default preferences and/or user preferences, the systems associated with house 520 may take action based on the unwanted visitor at house 520. In one example, the doors and windows at house 520 may automatically lock. If a garage door is open, the door may be closed. Depending on the perceived threat level, the geometric shape at house 520 may illuminate a pre-determined color or start flashing a pre-determined pattern. Each event may be mutually exclusive or the events may occur in combination.

As described previously, the data received from other sources and other houses may be used to determine a security event, and/or a threat level based on the user preferences of an occupant or multiple occupants at house 515. An increased threat level at a neighboring house (e.g., house 520) may result in an increased threat level at house 515 and vice versa. Similarly, a decreased threat level at a neighboring house (e.g., house 520) may result in a decreased threat level at hours 515 and vice versa. In some embodiments, an increased (or decreased) threat level at a neighboring house may be determined based on the neighboring house occupants' user preferences; thus, the same security events which determine a threat level at a neighboring house may not result in the same threat level at house 515 due to differing user preferences. In some embodiments, the threat level at a neighboring house in and of itself may be used to determine a threat level at house 515.

For example, where the system receives an indication that house 545 has an unexpected visitor (or other, the occupants of house 515 may have a user preference which indicates that an unexpected visitor at house 545 is not a security event. Thus, the geometric shape associated with house 545 may light up red, for example, or start flashing, whereas the geometric shape associated with house 515 may remain white or may illuminate a steady yellow color.

The occupants of house 515 may have a user preference which indicates that an unexpected visitor at house 510 is a security event, however, as house 510 is next door to house 515. Thus, the geometric shapes at both houses may illuminate red. In addition, the action component 440 may initiate a security action at either or both of houses 510 and 515 based on the unexpected visitor at house 510.

In another example, the occupants of house 515 may be aware that the occupants of house 510 have a dog, but that the dog always barks when someone walks by. Thus, an indication that the dog of house 510 is barking may not rise to the level of a security event in the minds of the occupants of house 515, and thus the geometric shape at house 515 may remain dark and no security action may be taken. In contrast, however, the occupants of house 535 may have a well-trained dog that only barks if there is a problem; thus, the occupants of house 545 may have a user preference which determines a barking dog at house 545 is indicative of a security event. As a result, the geometric shape at house 535 may illuminate red and a security action may be initiated based on the barking dog.

In another example, if a security event and a threat level is determined at any of the houses within the dotted line 505 (e.g., houses that partake in the neighborhood watch), a perceived threat at one house may cause all of the geometric shapes associated with houses 510-545 to illuminate a pre-determined color, flash a pre-determined pattern, and/or a security action may be initiated. In some cases, the camera at one house (e.g., house 545) may determine a security threat, such as a suspicious car driving by, and may send instructions to another house down the street in the direction of the traveling car to activate a recording mode, or to adjust settings for better recording. For example, if a suspicious car drives by house 545 going westbound, house 545 may illuminate its geometric shape and send a notification to house 535 to illuminate house 535's geometric shape. In addition, the notification may instruct house 535 to increase the camera's frame rate for recording the car as it passes by.

In some cases, houses 510 and/or 530, which may not have a camera/light system or be part of the watch, may receive a notification based on the fact that the home's participating the neighborhood watch have perceived a threat.

Data received from or associated with other houses or received from third parties may be considered similarly to data and security events determined within the house. Thus, data from other sources may result in determining the existence of a first or additional security event, may result in creating or alerting a threat level, and may result in illuminating the geometric shape and/or activating a security action. In some embodiments data received from third parties may result in sending a notification to an occupant of house 515, or may result in the system of or occupant of house 515 sending a notification to a third party, including another house in the neighborhood. Notifications may also include the system of or an occupant of house 515 communicating with an emergency service with respect to a security event determined at another location.

Other embodiments utilizing the methods and systems described above may be further contemplated. In one embodiment, users (e.g., occupants) of a residence may establish an initial set-up the camera and geometric shape. The initial set-up may include determining user preferences, known security events, threat levels, known persons and animals, unknown persons and animals, authorized persons and animals, unauthorized persons and animals, profile data for occupants, profile data for neighbors, preferred third party sources, and the like.

Figure 6:
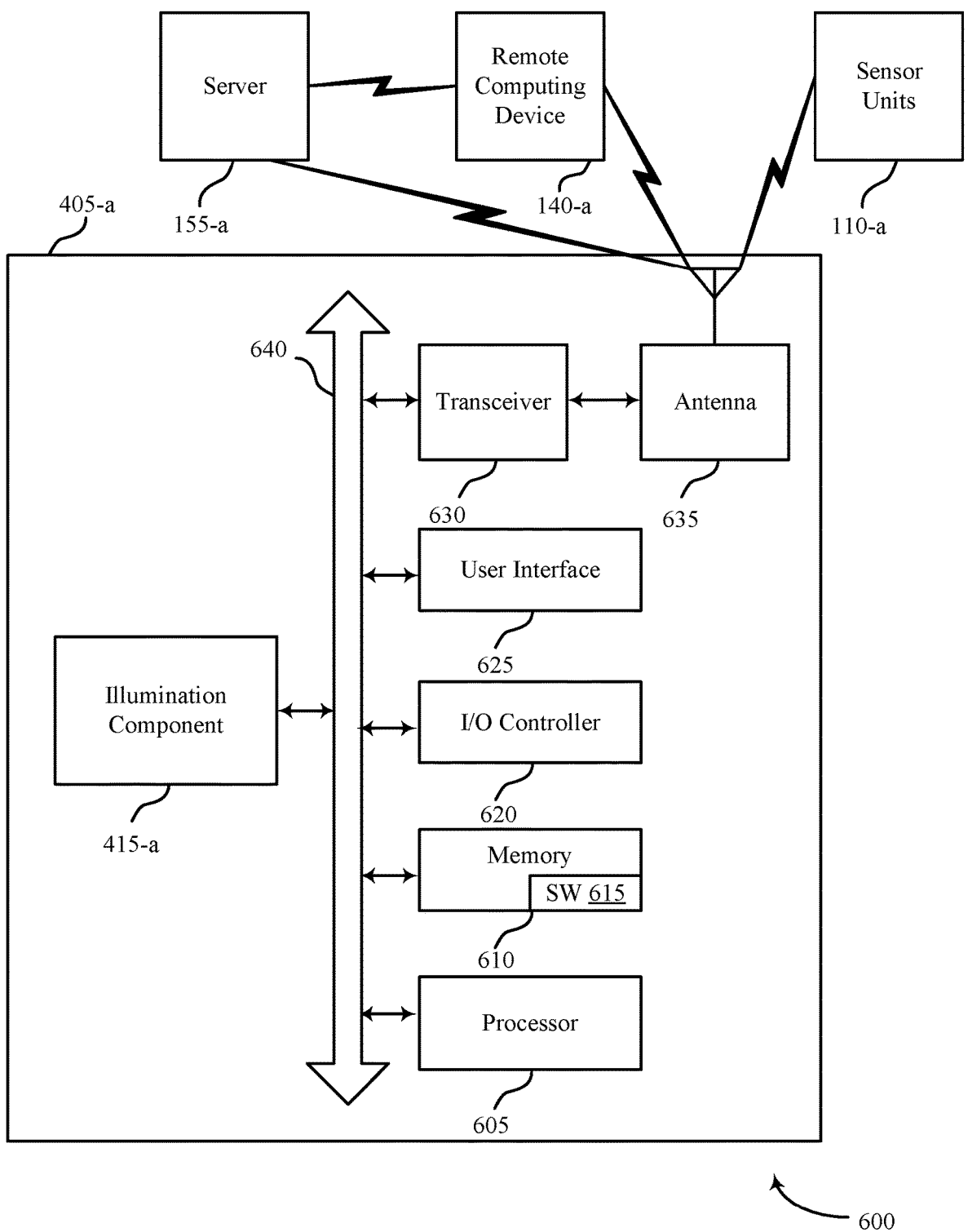
FIG. 6 shows a block diagram of an example apparatus relating to a security and automation system, in accordance with one or more examples of the present disclosure.

FIG. 6 shows a block diagram 600 of an apparatus 405-*a* relating to a security and automation system, in accordance with one or more aspects of the present disclosure. Apparatus 405-*a* may be an example of the control panel 135, local computing device 120, remote computing device 140 and/or the sensor units 110 of FIG. 1. In some examples, apparatus 405-*a* may also be an example of one or more aspects of camera 205, or apparatus 305, and/or 405 with reference to FIGS. 2-4.

Apparatus 405-*b* may include an illumination component 415-*a* which may be an example of the illumination component 315 and/or 415 described with reference to FIGS. 2 and 3. The illumination component 415-*a* may provide security and automation techniques related to a neighborhood watch as described above with reference to FIGS. 1-5.

Apparatus 405-*a* may also include components for bi-directional data communications including components for transmitting communications and components for receiving communications. For example, apparatus 405-*a* may communicate bi-directionally with remote computing device 140-*a*, server 155-*a*, or sensor units 110-*a*. This bi-directional communication may be direct (e.g., apparatus 405-*a* communicating directly with sensor units 110-*a* or remote computing device 140-*a*) or indirect (e.g., apparatus 405-*a* communicating with remote computing device 140-*a* via server 155-*a*). Server 155-*a*, remote computing device 140-*a*, and sensor units 110-*a* may be examples of server 155, remote computing device 140, and sensor units 110 as shown with respect to FIG. 1.

Apparatus 405-*a* may also include a processor 605, and memory 610 (including software (SW) 615), an input/output (I/O) controller 620, a user interface 625, a transceiver 630, and one or more antennas 635, each of which may communicate—directly or indirectly—with one another (e.g., via one or more buses 640). The transceiver 630 may communicate bi-directionally—via the one or more antennas 635, wired links, and/or wireless links—with one or more networks or remote devices as described above. For example, the transceiver 630 may communicate bi-directionally with one or more of server 155-*a* or sensor unit 110-*a*. The transceiver 630 may include a modem to modulate the packets and provide the modulated packets to the one or more antennas 635 for transmission, and to demodulate packets received from the one or more antennas 635. While an apparatus 405-*a* may include a single antenna 635, the apparatus may also have multiple antennas 635 capable of concurrently transmitting or receiving multiple wired and/or wireless transmissions. In some embodiments, one element of apparatus 405-*a* (e.g., one or more antennas 635, transceiver 630) may provide a direct connection to a server 155-*a* via a direct network link to the Internet via a POP (point of presence). In some embodiments, one element of apparatus 405-*a* (e.g., one or more antennas 635, transceiver 630) may provide a connection using wireless techniques, including digital cellular telephone connection, Cellular Digital Packet Data (CDPD) connection, digital satellite data connection, and/or another connection.

The signals associated with apparatus 405-*a*, server 155-*a*, remote computing device 140-*a*, and/or sensor unit 110-*a* may include wireless communication signals such as radio frequency, electromagnetics, local area network (LAN), wide area network (WAN), virtual private network (VPN), wireless network (using 802.11, for example), 345 MHz, Z Wave, cellular network (using 3G, LTE, and/or 5G for example), and/or other signals. The one or more antennas 635 and/or transceiver 630 may include or be related to, but are not limited to, wireless wide area network (WWAN) (GSM, CDMA, and WCDMA), WLAN (including Bluetooth and Wi-Fi), WMAN (WiMAX), antennas for mobile communications, antennas for Wireless Personal Area Network (WPAN) applications (including radio-frequency identification (RFID) and ultra-wideband (UWB)). In some embodiments, each antenna 635 may receive signals or information specific and/or exclusive to itself. In other embodiments each antenna 635 may receive signals or information neither specific nor exclusive to itself.

In some embodiments, the user interface 625 may include an audio device, such as an external speaker system, a visual device such as a camera or video camera, an external display device such as a display screen, and/or an input device (e.g., remote control device interfaced with the user interface 625 directly and/or through I/O controller 620). In some examples, one or more buses 640 may allow data communication between one or more elements of apparatus 405-a (e.g., processor 605, memory 610, I/O controller 620, user interface 625).

The memory 610 may include random access memory (RAM), read only memory (ROM), flash RAM, and/or other types. The memory 610 may store computer-readable, computer-executable software/firmware code 615 including instructions that, when executed, cause the processor 605 to perform various functions described in this disclosure (e.g., analyzing the authentication credentials, transmitting a message to a remote device). Alternatively, the computer-executable software/firmware code 615 may not be directly executable by the processor 605 but may cause a computer (e.g., when compiled and executed) to perform functions described herein.

In some embodiments the processor 605 may include, among other things, an intelligent hardware device (e.g., a central processing unit (CPU), a microcontroller, and/or an ASIC). The memory 610 may contain, among other things, the Basic Input-Output system (BIOS) which may control basic hardware and/or software operation such as the interaction with peripheral components or devices. For example, the illumination component 415-a may be stored within the memory 610. Applications resident with apparatus 405-a are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver 630, one or more antennas 635).

Many other devices and/or subsystems may be connected to, or may be included as, one or more elements of apparatus 405-a (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 6 need not be present to practice the present systems and methods. The devices and subsystems can be interconnected in different ways from that shown in FIG. 6. In some embodiments, an aspect of some operation of a system, such as that shown in FIG. 6, may be readily understood and is not discussed in detail in this disclosure. Code to implement the present disclosure may be stored in a non-transitory computer-readable medium such as one or more of memory 610 or other memory. The operating system provided on I/O controller 620 may be iOS®, ANDROID®, MS-dOS®, MS-WINDOWS®, OS/2®, UNIX®, LINUX®, or another known operating system.

The components of the apparatus 405-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner. The functions of each module may also be implemented—in whole or in part—with instructions embodied in memory formatted to be executed by one or more general and/or application-specific processors.

Figure 7:
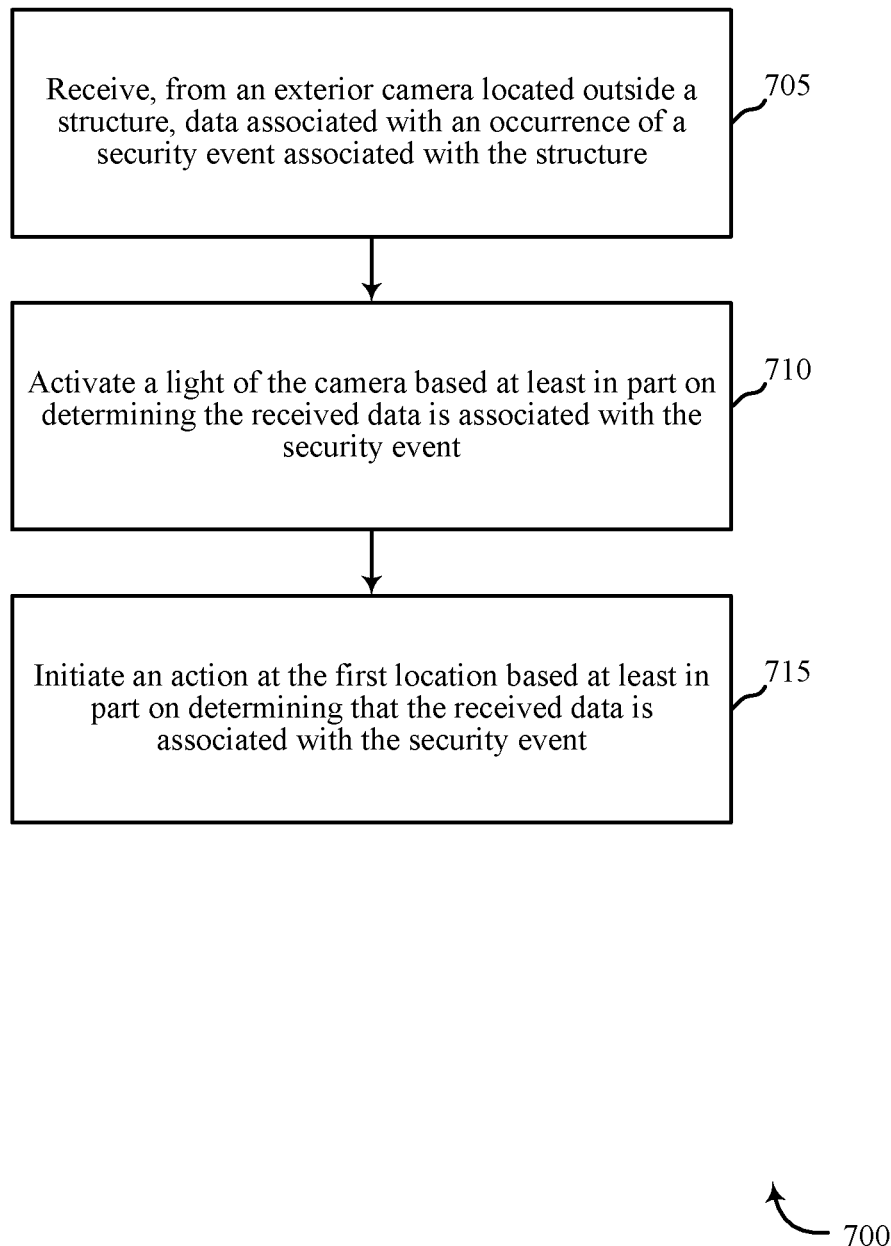
FIG. 7 is a flow chart illustrating an example of a method relating to a security and/or an automation system, in accordance with one or more examples of the present disclosure.

FIG. 7 is a flow chart illustrating an example of a method 700 relating to a security and/or an automation system, in accordance with one or more aspects of the present disclosure. For clarity, the method 700 is described below with reference to aspects of one or more of the sensor units 110, local computing device 120, control panel 135, and/or remote computing device 140 as described with reference to at least FIG. 1. In addition, method 700 is described below with reference to aspects of one or more of the camera 205, or apparatus 305, 405, and 405-a described with reference to at least FIGS. 2-6. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 705, the method 700 may include receiving, from an exterior camera located outside a structure, data associated with an occurrence of a security event associated with the structure. The operation at block 705 may be performed using the illumination component 315, illumination component 415, security event component 420, threat level component 430, control panel 135, sensor units 110, camera 205, or apparatus 305, 405, and/or 405-a described with reference to FIGS. 1-6.

At block 710, the method 700 may include activating a light of the camera based at least in part on determining the received data is associated with the security event. The operation at block 710 may be performed using the illumination component 315, illumination component 415, security event component 420, threat level component 430, light activation component 435, control panel 135, sensor units 110, camera 205, or apparatus, 305, 405, and/or 405-a described with reference to FIGS. 1-6.

At block 715, the method 700 may include illuminating an action at the first location based at least in part on determining that the received data is associated with the security event. The operation at block 715 may be performed using the illumination component 315, illumination component 415, security event component 420, threat level component 430, light activation component 435, action component 440, control panel 135, sensor units 110, camera 205, or apparatus 305, 405, and/or 405-a described with reference to FIGS. 1-6.

Figure 8:
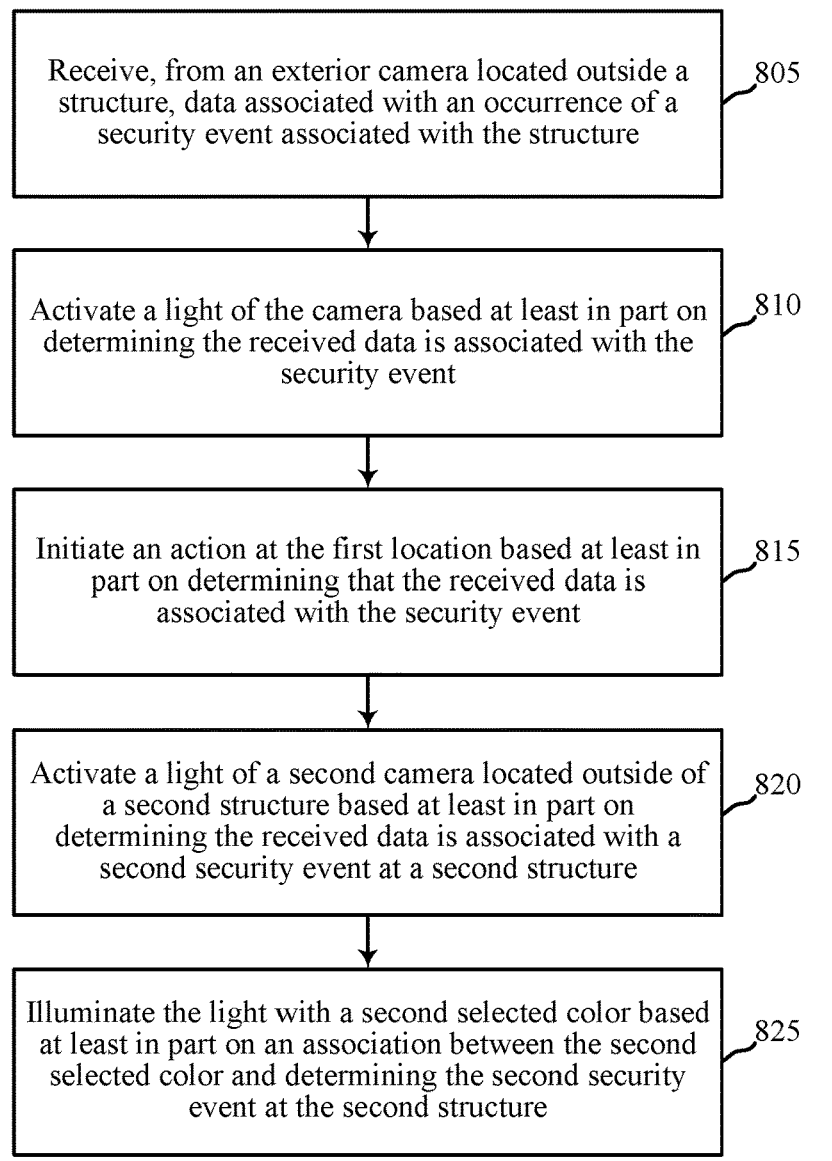
FIG. 8 is a flow chart illustrating an example of a method relating to a security and/or an automation system, in accordance with one or more examples of the present disclosure.

FIG. 8 is a flow chart illustrating an example of a method 700 relating to a security and/or an automation system, in accordance with one or more aspects of the present disclosure. For clarity, the method 800 is described below with reference to aspects of one or more of the sensor units 110, local computing device 120, control panel 135, and/or remote computing device 140 as described with reference to at least FIG. 1. In addition, method 700 is described below with reference to aspects of one or more of the camera 205, 205-a, and 205-b or apparatuses described with reference to at least FIGS. 2-5. In some examples, control panel 135, local computing device 120, and/or sensor units 110 may execute one or more sets of codes to control the functional elements described below. Additionally or alternatively, the control panel 135, local computing device 120, and/or sensor units 110 may perform one or more of the functions described below using special-purpose hardware.

At block 805, the method 800 may include receiving, from an exterior camera located outside a structure, data associated with an occurrence of a security event associated with the structure. The operation at block 805 may be performed using the illumination component 315, illumination component 415, security event component 420, threat level component 430, control panel 135, sensor units 110, camera 205, or apparatus 305, 405, and/or 405-a described with reference to FIGS. 1-6.

At block 810, the method 800 may include activating a light of the camera based at least in part on determining the received data is associated with the security event. The operation at block 810 may be performed using the illumination component 315, illumination component 415, security event component 420, threat level component 430, light activation component 435, control panel 135, sensor units 110, camera 205, or apparatus 305, 405, and/or 405-a described with reference to FIGS. 1-6.

At block 815, the method 800 may include illuminating an action at the first location based at least in part on determining that the received data is associated with the security event. The operation at block 815 may be performed using the illumination component 315, illumination component 415, security event component 420, threat level component 430, light activation component 435, action component 440, control panel 135, sensor units 110, camera 205, or apparatus 305, 405, and/or 405-a described with reference to FIGS. 1-6.

At block 820, the method 800 may include activating a light of a second camera located outside of the second structure based at least in part on determining the received data is associated with a second security event at the second structure. The operation at block 820 may be performed using the illumination component 315, illumination component 415, security event component 420, threat level component 430, light activation component 435, action component 440, control panel 135, sensor units 110, camera 205, or apparatus 305, 405, and/or 405-a described with reference to FIGS. 1-6.

At block 825, the method 800 may include illuminating the light with a second selected color based at least in part on an association between the second elected color and determining the second security event at the second structure. The operation at block 820 mays be performed using the illumination component 315, illumination component 415, security event component 420, threat level component 430, light activation component 435, action component 440, control panel 135, sensor units 110, camera 205, or apparatus 305, 405, and/or 405-a described with reference to FIGS. 1-6.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media, including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and BLU-RAY disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some examples, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Further, while various examples have been described and/or illustrated here in the context of fully functional computing systems, one or more of these exemplary examples may be distributed as a program product in a variety of forms, regardless of the particular type of computer-readable media used to actually carry out the distribution. The examples disclosed herein may also be implemented using software modules that perform certain tasks. These software modules may include script, batch, or other executable files that may be stored on a computer-readable storage medium or in a computing system. In some examples, these software modules may permit and/or instruct a computing system to perform one or more of the exemplary examples disclosed here.

This description, for purposes of explanation, has been described with reference to specific examples. The illustrative discussions above, however, are not intended to be exhaustive or limit the present systems and methods to the precise forms discussed. Many modifications and variations are possible in view of the above teachings. The examples were chosen and described in order to explain the principles of the present systems and methods and their practical applications, to enable others skilled in the art to utilize the present systems, apparatus, and methods and various examples with various modifications as may be suited to the particular use contemplated.

What is claimed is:

1. A method for security or automation systems, comprising:
   receiving, from a camera located outside a first structure, data associated with an occurrence of a security event associated with the first structure;
   determining that the received data is associated with the security event based at least in part on one or more computer learning techniques;
   assigning a threat level to the security event based at least in part on data from the camera and a type of the security event, the type of the security event determined based at least in part on the one or more computer learning techniques;
   determining, using the one or more computer learning techniques, whether the security event is authorized based at least in part on detecting a plurality of security events having the type of the security event within a period of time, the plurality of security events comprising the security event;
   determining, using the one or more computer learning techniques, that the plurality of security events occurs in a threshold field of view;
   sending a notification to adjust a field of view of the camera based at least in part on determining that the plurality of security events occurs in the threshold field of view;
   updating the threat level of the security event using the one or more computer learning techniques based at least in part on processing a user input received in response to the security event and determining whether the security event is authorized;
   activating a light of the camera based at least in part on determining the received data is associated with the security event and the updated threat level, wherein a characteristic of the light is associated with the updated threat level; and
   initiating an action at a first location based at least in part on the one or more computer learning techniques, determining that the received data is associated with the security event, and the updated threat level.

2. The method of claim 1, wherein activating the light further comprises activating a geometric light shape disposed around a face of a lens of the camera.

3. The method of claim 1, wherein activating the light further comprises:
   illuminating the light with a selected color based at least in part on an association between the selected color and receiving data associated with the occurrence of the security event.

4. The method of claim 1, wherein activating the light further comprises:
   illuminating the light with a selected flashing pattern based at least in part on an association between the selected flashing pattern and receiving data associated with the occurrence of the security event.

5. The method of claim 3, further comprising:
   determining an occurrence of a second security event associated with the first structure occurring after the security event; and
   selecting a second color to light a geometric light shape based at least in part on determining the occurrence of the second security event.

6. The method of claim 3, further comprising:
   selecting a second color to light a geometric light shape based at least in part on a passage of time after the occurrence of the security event.

7. The method of claim 1, wherein receiving data associated with the occurrence of the security event further comprises receiving data associated with the security event occurring within a predetermined distance of the first structure.

8. The method of claim 1, wherein receiving data associated with the occurrence of the security event further comprises receiving data associated with the occurrence of a third security event at a second structure in wireless communication with the first structure.

9. The method of claim 8, further comprising:
activating a light of a second camera located outside of the second structure based at least in part on determining the received data is associated with the third security event at the second structure; and
illuminating the light with a second selected color based at least in part on an association between the second selected color and determining the third security event at the second structure.

10. The method of claim 9, further comprising:
sending an instruction to a third structure to activate a light of a third camera located outside the third structure based at least in part on determining that the received data is associated with a fourth security event at the third structure and the third security event at the second structure.

11. The method of claim 10, further comprising:
coordinating at least one of a color and a flashing pattern of the light of the camera, the second camera, and the third camera based at least in part on determining the security events at the first structure, the second structure, and the third structure are related.

12. The method of claim 8, wherein receiving data associated with the occurrence of the third security event at the second structure further comprises receiving data associated with a neighboring security event at a neighboring house.

13. The method of claim 1, further comprising:
determining that the occurrence of the security event is an approved event; and
deactivating the light based at least in part on the determining.

14. The method of claim 13, wherein determining that the occurrence of the security event is an approved event further comprises:
determining the security event is approved based at least in part on determining historic event data occurring over a predetermined period of time.

15. The method of claim 1, wherein initiating the action further comprises at least one of:
activating an alarm, closing a door, locking the door, locking a window, activating sprinklers, activating a video mode on the camera, sending a first notification to an occupant of the first location, sending the first notification or a second notification to a third party, closing a garage door, locking a motor vehicle door, or a combination thereof.

16. The method of claim 15, wherein activating the alarm further comprises:
activating one of a plurality of alarms based at least in part on determining the occurrence of the security event.

17. The method of claim 1, further comprising:
sending a suggested action to an occupant of the first structure based at least in part on receiving data associated with the security event.

18. The method of claim 1, wherein receiving data associated with the occurrence of the security event associated with the first structure further comprises:

receiving, from the camera, an indication of a presence of a person located within a predetermined distance of the first location;
determining that the person is not approved to be within the predetermined distance of the first location; and
wherein activating the light further comprises illuminating the light with a predetermined color based at least in part on determining that the person is not approved.

19. An apparatus for security or automation systems, comprising:
a processor;
memory in electronic communication with the processor; and
instructions stored in the memory, the instructions being executable by the processor to:
receive, from a camera located outside a structure, data associated with an occurrence of a security event associated with the structure;
determine that the received data is associated with the security event based at least in part on one or more computer learning techniques;
assign a threat level to the security event based at least in part on data from the camera and a type of the security event, the type of the security event determined based at least in part on the one or more computer learning techniques;
determine, using the one or more computer learning techniques, whether the security event is authorized based at least in part on detecting a plurality of security events having the type of the security event within a period of time, the plurality of security events comprising the security event;
determine, using the one or more computer learning techniques, that the plurality of security events occurs in a threshold field of view;
send a notification to adjust a field of view of the camera based at least in part on determining that the plurality of security events occurs in the threshold field of view;
update the threat level of the security event using the one or more computer learning techniques based at least in part on processing a user input received in response to the security event and determining whether the security event is authorized;
activate a light of the camera based at least in part on determining the received data is associated with the security event and the updated threat level, wherein a characteristic of the light is associated with the updated threat level; and
initiate an action at a first location based at least in part on the one or more computer learning techniques, determining that the received data is associated with the security event, and the updated threat level.

20. A non-transitory computer-readable medium storing computer-executable code, the code executable by a processor to:
receive, from a camera located outside a structure, data associated with an occurrence of a security event associated with the structure;
determine that the received data is associated with the security event based at least in part on one or more computer learning techniques;
assign a threat level to the security event based at least in part on data from the camera and a type of the security event, the type of the security event determined based at least in part on the one or more computer learning techniques;

determine, using the one or more computer learning techniques, whether the security event is authorized based at least in part on detecting a plurality of security events having the type of the security event within a period of time, the plurality of security events comprising the security event;

determine, using the one or more computer learning techniques, that the plurality of security events occurs in a threshold field of view;

send a notification to adjust a field of view of the camera based at least in part on determining that the plurality of security events occurs in the threshold field of view;

update the threat level of the security event using the one or more computer learning techniques based at least in part on processing a user input received in response to the security event and determining whether the security event is authorized;

activate a light of the camera based at least in part on determining the received data is associated with the security event and the updated threat level, wherein a characteristic of the light is associated with the updated threat level; and initiate an action at a first location based at least in part on the one or more computer learning techniques, determining that the received data is associated with the security event, and the updated threat level.

* * * * *